(12) United States Patent
Hirayama

(10) Patent No.: US 12,712,979 B2
(45) Date of Patent: Aug. 18, 2026

(54) IMAGE PROCESSING DEVICE, IMAGE PROCESSING METHOD, AND NON-TRANSITORY COMPUTER-READABLE STORAGE MEDIUM STORING IMAGE PROCESSING PROGRAM

(71) Applicant: SEIKO EPSON CORPORATION, Tokyo (JP)

(72) Inventor: Hisashi Hirayama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 217 days.

(21) Appl. No.: 18/781,819

(22) Filed: Jul. 23, 2024

(65) Prior Publication Data

US 2025/0039324 A1 Jan. 30, 2025

(30) Foreign Application Priority Data

Jul. 24, 2023 (JP) ................................ 2023-119944

(51) Int. Cl.

| | |
|---|---|
| ***G06T 7/90*** | (2017.01) |
| ***G06F 3/12*** | (2006.01) |
| ***G06F 3/14*** | (2006.01) |
| ***G06T 5/92*** | (2024.01) |
| ***H04N 1/60*** | (2006.01) |

(52) U.S. Cl.

CPC ................ *H04N 1/60* (2013.01); *G06F 3/12* (2013.01); *G06F 3/14* (2013.01); *G06T 5/92* (2024.01); *G06T 7/90* (2017.01); *G06T 2207/10024* (2013.01)

(58) Field of Classification Search

CPC .... H04N 1/60; G06T 7/90; G06T 5/92; G06T 2207/10024; G06F 3/12; G06F 3/14

USPC ........................................................ 382/167

See application file for complete search history.

(56) References Cited

U.S. PATENT DOCUMENTS

2022/0043615 A1* 2/2022 Mukai .................. G06F 3/1268
2022/0044085 A1* 2/2022 Mukai ..................... H04N 1/52

FOREIGN PATENT DOCUMENTS

JP 2022032012 2/2022

* cited by examiner

*Primary Examiner* — Jonathan S Lee
(74) *Attorney, Agent, or Firm* — WORKMAN NYDEGGER

(57) ABSTRACT

An embodiment of the present disclosure includes: acquiring image data including first image data representing a first image with a plurality of colors including a color other than a special color and second image data representing a second image with the special color; acquiring an amount of representative color material indicating an amount of a plurality of color materials used for printing by a printing device; converting the first image data into first amount-of-color-material data representing a color of the first image by an amount of a plurality of color materials, based on a color conversion profile, and converting the second image data into second amount-of-color-material data representing a color of the second image by an amount of a plurality of color materials, based on the amount of representative color material; and combining the first amount-of-color-material data and the second amount-of-color-material data and thus generating third amount-of-color-material data.

10 Claims, 7 Drawing Sheets

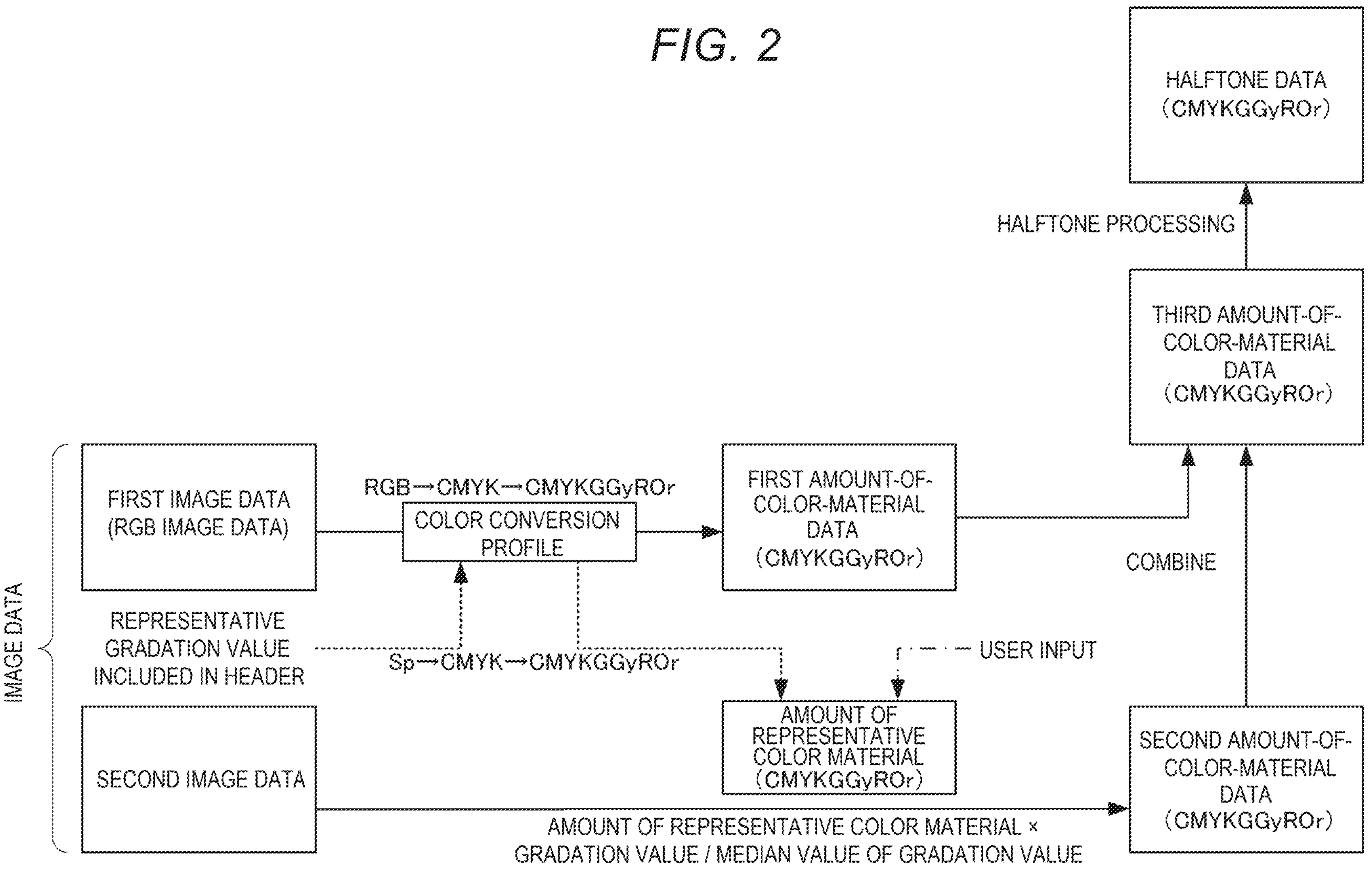
FIG. 2
HALFTONE DATA (CMYKGGyROr)
HALFTONE PROCESSING
THIRD AMOUNT-OF-COLOR-MATERIAL DATA (CMYKGGyROr)
FIRST IMAGE DATA (RGB IMAGE DATA)
RGB→CMYK→CMYKGGyROr
COLOR CONVERSION PROFILE
FIRST AMOUNT-OF-COLOR-MATERIAL DATA (CMYKGGyROr)
COMBINE
IMAGE DATA
REPRESENTATIVE GRADATION VALUE INCLUDED IN HEADER
Sp→CMYK→CMYKGGyROr
USER INPUT
AMOUNT OF REPRESENTATIVE COLOR MATERIAL (CMYKGGyROr)
SECOND IMAGE DATA
AMOUNT OF REPRESENTATIVE COLOR MATERIAL ×
GRADATION VALUE / MEDIAN VALUE OF GRADATION VALUE
SECOND AMOUNT-OF-COLOR-MATERIAL DATA (CMYKGGyROr)

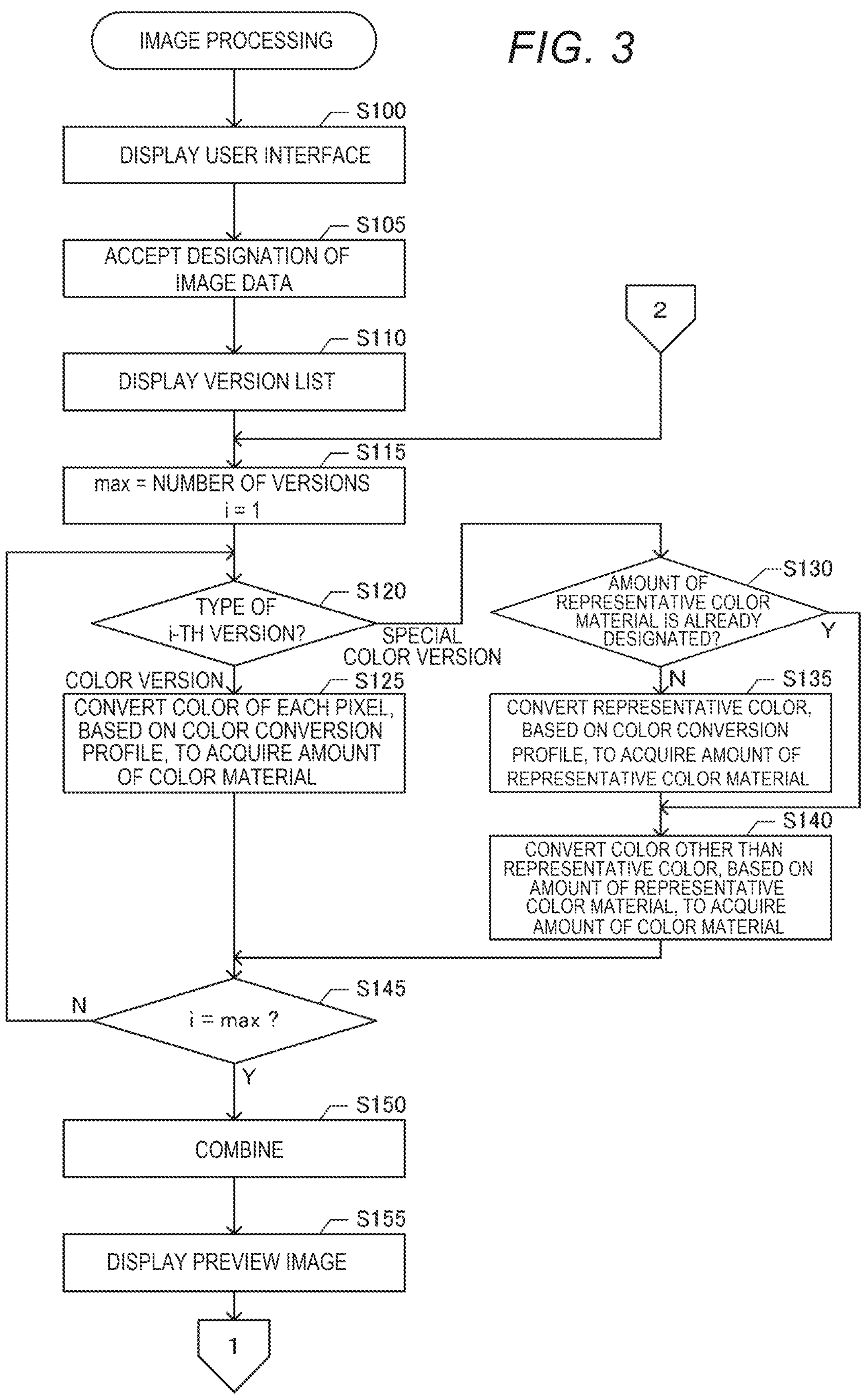

FIG. 3
IMAGE PROCESSING
S100
DISPLAY USER INTERFACE
S105
ACCEPT DESIGNATION OF IMAGE DATA
2
S110
DISPLAY VERSION LIST
S115
max = NUMBER OF VERSIONS
i = 1
S120
TYPE OF i-TH VERSION?
SPECIAL COLOR VERSION
S130
AMOUNT OF REPRESENTATIVE COLOR MATERIAL IS ALREADY DESIGNATED?
Y
COLOR VERSION
S125
CONVERT COLOR OF EACH PIXEL, BASED ON COLOR CONVERSION PROFILE, TO ACQUIRE AMOUNT OF COLOR MATERIAL
N
S135
CONVERT REPRESENTATIVE COLOR, BASED ON COLOR CONVERSION PROFILE, TO ACQUIRE AMOUNT OF REPRESENTATIVE COLOR MATERIAL
S140
CONVERT COLOR OTHER THAN REPRESENTATIVE COLOR, BASED ON AMOUNT OF REPRESENTATIVE COLOR MATERIAL, TO ACQUIRE AMOUNT OF COLOR MATERIAL
S145
N
i = max ?
Y
S150
COMBINE
S155
DISPLAY PREVIEW IMAGE
1

FILE JOB

PRINT

14

PRINT JOB LIST

DATA A

VERSION LIST

COLOR VERSION

SPECIAL COLOR VERSION

11

12

ADJUSTMENT OF AMOUNT OF REPRESENTATIVE COLOR MATERIAL

ADJUSTMENT OF AMOUNT OF REPRESENTATIVE COLOR MATERIAL

| | |
|---|---|
| CYAN | 96.5 |
| MAGENTA | 19.2 |
| YELLOW | 0.0 |
| BLACK | 7.5 |
| GREEN | 24.3 |
| GRAY | 0.0 |
| RED | 0.0 |
| ORANGE | 0.0 |

PRINT PROCESSING

S300 GENERATE PRINT DATA

S305 TRANSMIT PRINT DATA

END

IMAGE PROCESSING DEVICE, IMAGE PROCESSING METHOD, AND NON-TRANSITORY COMPUTER-READABLE STORAGE MEDIUM STORING IMAGE PROCESSING PROGRAM

The present application is based on, and claims priority from JP Application Serial Number 2023-119944, filed Jul. 24, 2023, the disclosure of which is hereby incorporated by reference herein in its entirety.

BACKGROUND

1. Technical Field

The present disclosure relates to an image processing device.

2. Related Art

According to the related art, a technique of printing an image including a plurality of versions is known. For example, JP-A-2022-32012 discloses a configuration where image data is categorized into a color version including cyan, magenta, yellow, and black, a white version, and a varnish version, and where a preview image is generated, based on the amount of ink used for printing of each version, and a preview is thus performed.

JP-A-2022-32012 is an example of the related art.

When an image including a color other than a special color and an image represented with the special color are described in different formats, printing based on the respective images cannot be executed through common image processing. Therefore, it has been desired to develop a technique that can execute image processing corresponding to each of an image including a color other than a special color and an image represented with the special color, and then perform printing.

SUMMARY

According to an aspect of the present disclosure, an image processing device includes: an image data acquisition unit configured to acquire image data including first image data representing a first image with a plurality of colors including a color other than a special color and second image data representing a second image with the special color; an amount-of-representative-color-material acquisition unit configured to acquire an amount of representative color material indicating an amount of a plurality of color materials used for printing a representative color included in the special color by a printing device; a conversion unit configured to convert the first image data into first amount-of-color-material data representing a color of the first image by an amount of a plurality of color materials used in the printing device, based on a color conversion profile, and convert the second image data into second amount-of-color-material data representing a color of the second image by an amount of a plurality of color materials used in the printing device, based on the amount of representative color material; a combining unit configured to combine the first amount-of-color-material data and the second amount-of-color-material data and thus generate third amount-of-color-material data; and a transmission unit configured to transmit print data based on the third amount-of-color-material data to the printing device.

According to another aspect of the present disclosure, an image processing method includes: acquiring image data including first image data representing a first image with a plurality of colors including a color other than a special color and second image data representing a second image with the special color; acquiring an amount of representative color material indicating an amount of a plurality of color materials used for printing a representative color included in the special color by a printing device; converting the first image data into first amount-of-color-material data representing a color of the first image by an amount of a plurality of color materials used in the printing device, based on a color conversion profile, and converting the second image data into second amount-of-color-material data representing a color of the second image by an amount of a plurality of color materials used in the printing device, based on the amount of representative color material; combining the first amount-of-color-material data and the second amount-of-color-material data and thus generating third amount-of-color-material data; and transmitting print data based on the third amount-of-color-material data to the printing device.

According to still another aspect of the present disclosure, a non-transitory computer-readable storage medium storing an image processing program is provided, the image processing program causing a computer to function as: an image data acquisition unit configured to acquire image data including first image data representing a first image with a plurality of colors including a color other than a special color and second image data representing a second image with the special color; an amount-of-representative-color-material acquisition unit configured to acquire an amount of representative color material indicating an amount of a plurality of color materials used for printing a representative color included in the special color by a printing device; a conversion unit configured to convert the first image data into first amount-of-color-material data representing a color of the first image by an amount of a plurality of color materials used in the printing device, based on a color conversion profile, and convert the second image data into second amount-of-color-material data representing a color of the second image by an amount of a plurality of color materials used in the printing device, based on the amount of representative color material; a combining unit configured to combine the first amount-of-color-material data and the second amount-of-color-material data and thus generate third amount-of-color-material data; and a transmission unit configured to transmit print data based on the third amount-of-color-material data to the printing device.

BRIEF DESCRIPTION OF THE DRAWINGS

FIG. 2 is a diagram showing a flow of image processing based on image data.

FIG. 3 is a flowchart showing image processing.

FIG. 6 shows an example of a user interface.

FIG. 7 is a flowchart of print processing.

DESCRIPTION OF EMBODIMENTS

An embodiment of the present disclosure will now be described in the following order.

Figure 1:
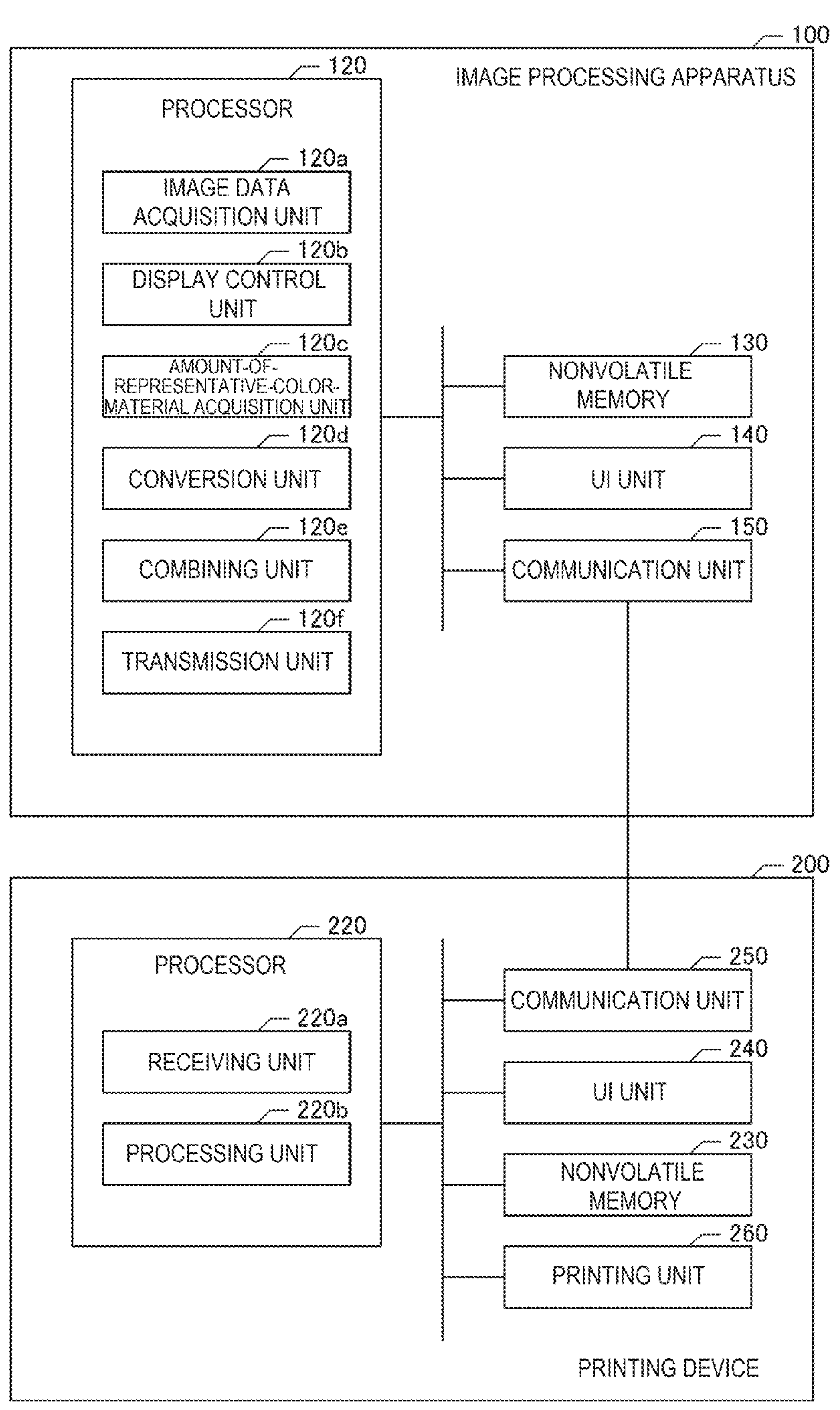
FIG. 1 is a block diagram illustrating the configuration of an image processing device.

(1) Configuration of Image Processing Device (1-1) Configuration of Image Processing Device (1-2) Configuration of Printing Device
(2) Image Processing
(3) Print Processing
(4) Other Embodiments (1) Configuration of Image Processing Device FIG. 1 is a block diagram illustrating the configuration of an image processing device according to an embodiment of the present disclosure. An image processing device 100 cooperates with a printing device 200. The image processing device 100 can communicate with the printing device 200. The image processing device 100 performs image processing based on image data, thus generates print data, and transmits the generated print data to the printing device 200. The printing device 200 executes printing based on the received print data.

The printing device 200 prints an image on a print medium, using a color material. Although the color material is not limited, the printing device 200 according to this embodiment is an inkjet printer using ink as the color material. Although the color of the color material is not limited, the printing device 200 according to this embodiment can print, using each color of cyan (C), magenta (M), yellow (Y), black (K), green (G), gray (Gy), red (R), and orange (Or).

Image data representing an image to be printed represents the image by a plurality of channels (color components). The image data may include a plurality of images having different numbers of channels. Specifically, the image data can include first image data in which the color of each pixel is specified by gradation values of three channels of RGB (red, green, blue) and second image data in which the color of each pixel is specified by a gradation value of one channel.

In the first image data, the color of each pixel is expressed by a combination of the gradation values of the three channels, and practically any color in a color gamut can be designated. The second image data is data representing an image expressed with a special color. That is, in the second image data, a gradation value of one channel is associated with each pixel, and the gradation value is a value corresponding to a relative density difference from the gradation value of a representative color. The representative color is a color representing the special color and is expressed by the gradation values of the three channels (RGB).

The special color is used to output an image in a predetermined specific color. In this embodiment, the special color includes a plurality of colors having different densities, and the representative color is one of these colors. The gradation value of the one channel included in the second image data indicates a relative density in relation to the representative color as a reference point. For example, when the gradation value of the one channel is expressed by 0 to 255 and the gradation value of a certain pixel is X, the amount of the color material of any pixel is specified by multiplying the amount of the color material representing the representative color by X/128. Hereinafter, the representative color is also referred to as Sp. Since the first image includes practically any color in the color gamut and the special color is also a color in the color gamut, the first image may include the special color and a color other than the special color.

As described above, the image represented by the image data may include the first image represented by the first image data and the second image represented by the second image data. That is, the image data may include a plurality of images having different numbers of channels of colors for expressing the image. In this specification, as described above, each of the images having different numbers of channels of colors for expressing the image is also referred to as a version. Also, since the first image is expressed practically with any color by each channel of RGB, the first image is referred to as a color version. Moreover, since the second image includes a specific representative color Sp and a color having a different density from that of the representative color Sp and is expressed with a special color, which is one of a limited number of colors, the second image is referred to as a special color version. The first image data is one of layers included in the image data and is also referred to as a first image layer. The second image data is one of the layers included in the image data and is also referred to as a second image layer. That is, the image data is data representing one image by superimposing the first image layer and the second image layer on each other.

(1-1) Configuration of Image Processing Device

The image processing device 100 includes a processor 120, a nonvolatile memory 130, a UI unit 140, and a communication unit 150. The processor 120 includes a CPU, a ROM, a RAM, and the like, not illustrated, and executes various programs recorded in the nonvolatile memory 130 and thus can control each unit of the image processing device 100. The processor 120 may be formed of a single chip or a plurality of chips. For example, an ASIC may be employed instead of the CPU, or the CPU and the ASIC may cooperate with each other.

The UI unit 140 includes a display (display device) that displays a freely selected image. The UI unit 140 includes an input unit such as a keyboard, a mouse, and a touch pad. The processor 120 can acquire an input content corresponding to an operation on the input unit of the UI unit 140. The communication unit 150 includes a communication interface for communicating with an external device according to various wired or wireless communication protocols. The image processing device 100 can communicate with the printing device 200 via the communication unit 150. A keyboard, a mouse, a display, or the like may be coupled via the communication unit 150, and the processor 120 may input and output various information via the device.

In this embodiment, the user of the image processing device 100 designates image data to be printed by operating the UI unit 140. In this embodiment, the user can adjust the color to be printed by operating the UI unit 140. In order to implement this function, the processor 120 can execute an image processing program, not illustrated, that is recorded in the nonvolatile memory 130. When the image processing program is executed, the processor 120 functions as an image data acquisition unit 120*a*, a display control unit 120*b*, an amount-of-representative-color-material acquisition unit 120*c*, a conversion unit 120*d*, a combining unit 120*e*, and a transmission unit 120*f*.

The image data acquisition unit 120*a* is a part of the processor 120 that has a function of acquiring image data. The user operates the UI unit 140 to designate a file stored in the nonvolatile memory 130 or the like and thus designates image data to be printed. In this embodiment, the image data includes at least one of the first image data and the second image data. FIG. 2 is a diagram showing a flow of image processing on image data according to this embodiment. In FIG. 2, the image data includes the first image data representing colors by the three channels of RGB and the second image data representing colors by one channel corresponding to a special color. The image processing will now be described with reference to FIG. 2 as appropriate.

The display control unit 120*b* is a part of the processor 120 that has a function of controlling the UI unit 140 to perform various displays. In this embodiment, the displays include a color setting unit for configuring a setting for the color of the image data. The color setting unit configures a setting that can affect the color of the image to be printed by the printing device 200, but in this embodiment, the content of the user interface displayed in the color setting unit changes according to the image data and a selection by the user.

That is, when the image data includes the first image data and does not include the second image data, the setting for a color related to the special color is unnecessary. Therefore, in this case, a color conversion profile designation unit (described in detail later), which is a user interface for configuring the setting for the color in the first image, is displayed. Meanwhile, an amount-of-color-material designation unit (described in detail later), which is a user interface for configuring a setting for the color in the second image, is not displayed.

When the image data includes the second image data and does not include the first image data, a setting for a color related to the special color may be configured. Therefore, in this case, the amount-of-color-material designation unit, which is a user interface for configuring a setting for the color in the second image, is displayed. For example, the color conversion profile designation unit may or may not be displayed for configuring a setting for the color conversion of the representative color Sp.

As illustrated in FIG. 2, when the image data includes the first image data and the second image data, both the setting for a freely selected color and the setting for a color related to the special color can be configured. Therefore, in this case, the color conversion profile designation unit and the amount-of-color-material designation unit are displayed. However, in this embodiment, the display control unit 120*b* causes the UI unit 140 to display the color conversion profile designation unit when the user selects the first image data (color version), and causes the UI unit 140 to display the amount-of-color-material designation unit when the user selects the second image data (special color version).

With the above-described user interface, the processor 120 receives a setting for a color set by the user operating the UI unit 140, and performs image processing for the color of the image data, based on the setting (described in detail later).

The amount-of-representative-color-material acquisition unit 120*c* is a part of the processor 120 that has a function of acquiring an amount of representative color material indicating an amount of a plurality of color materials used by the printing device 200 to print the representative color Sp included in the special color. In this embodiment, a representative gradation value, which is a gradation value indicating the representative color Sp, is included in a header or the like of the image data. For example, when the representative gradation value indicating the representative color Sp of the special color is (R, G, B)=(16, 33, 139), this representative gradation value is included in the header or the like of the image data.

The representative gradation value indicating the representative color Sp is a value expressing the special color, based on an RGB color space, which is the color space of the first image data. Therefore, in order for the printing device 200 to print the representative color Sp, it is necessary to specify the amount of the color material. In this embodiment, the amount-of-representative-color-material acquisition unit 120*c* acquires, as the amount of representative color material, a gradation value obtained by converting the representative gradation value based on the color conversion profile by the conversion unit 120*d*, described later. As described above, since the printing device 200 uses the color materials of the respective colors of CMYKGGyROr, in this embodiment, the amount of representative color material after the color conversion is designated by the gradation value for each color of CMYKGGyROr. In FIG. 2, a dashed line arrow indicates the specification of the amount of representative color material by the color conversion as described above.

In this embodiment, the user can directly designate the amount of representative color material without being based on the color conversion profile. That is, for example, the amount-of-representative-color-material acquisition unit 120*c* can acquire, as the amount of representative color material, a gradation value of each color input by the user operating the UI unit 140 while visually recognizing the amount-of-color-material designation unit included in the color setting unit 13 in FIG. 6, described later. In FIG. 2, a dash-dotted line arrow indicates the specification of the amount of representative color material as described above.

The conversion unit 120*d* is a part of the processor 120 that has a function of converting image data into amount-of-color-material data. The amount-of-color-material data is a gradation value indicating the amount of the color material of each color used by the printing device 200. In this embodiment, the image data is represented by the three channels of RGB or the one channel of the special color, while the amount-of-color-material data is represented by the eight channels of CMYKGGyROr. The conversion unit 120*d* performs conversion in different conversion modes, depending on the type of image data.

The first image data represented by the three channels of RGB is converted, based on the color conversion profile. That is, as shown in FIG. 2, the conversion unit 120*d* converts the first image data into first amount-of-color-material data, based on the color conversion profile stored in nonvolatile memory 130. The color conversion profile can be generated by various known techniques. In this embodiment, the data of the three channels of RGB is color-converted into data of the four channels of CMYK by a predetermined function. Also, in this embodiment, the data of the four channels of CMYK is converted into the first amount-of-color-material data of the eight channels of CMYKGGyROr, based on a LUT (Look Up Table).

Meanwhile, the second image data represented by the one channel of the special color is converted into second amount-of-color-material data in which the color of the second image is expressed by the amount of a plurality of color materials used by the printing device, based on the amount of representative color material. The special color includes the representative color Sp and a color other than the representative color Sp, and the amount of the color material when printing the representative color Sp is acquired as the amount of representative color material, as described above. Meanwhile, the gradation value of the one channel represented by the second image data indicates a relative density in relation to the representative color as a reference point. Therefore, the gradation value of the amount of representative color material can be multiplied by (gradation value of each pixel/median of gradation value) and thus converted into the amount of the color material of each pixel. For example, in the case where the gradation value of the one channel is represented by 0 to 255 and the gradation value of a certain pixel is X, when the amount of representative color material is ($C_1$, $M_1$, $Y_1$, $K_1$, $G_1$, $Gy_1$, $R_1$, $Or_1$), the amount of the color material for printing the color of the pixel is acquired by multiplying each of ($C_1$, $M_1$, $Y_1$, $K_1$, $G_1$, $Gy_1$, $R_1$, $Or_1$) by X/128. As described above, the conversion unit 120*d* acquires the second amount-of-color-material data representing the color of the second image by multiplying the amount of representative color material by the relative value specified based on the gradation value of the one channel. That is, in this embodiment, in the state where the amount of representative color material is acquired, the second image data is converted into the second amount-of-color-material data without being based on the color conversion profile.

The combining unit 120*e* is a part of the processor 120 that has a function of combining the first amount-of-color-material data and the second amount-of-color-material data to generate third amount-of-color-material data. The image data is data for printing an image in which the first image and the second image are superimposed. As illustrated in FIG. 2, the combining unit 120*e* generates the third amount-of-color-material data representing the amount of the color material for causing the printing device 200 to print the image in which the first image and the second image are superimposed by combining the first amount-of-color-material data and the second amount-of-color-material data. In this embodiment, the combining is processing of acquiring the sum of the gradation value indicated by the first amount-of-color-material data and the gradation value indicated by the second amount-of-color-material data for each pixel and each color, and the combining may be performed by various methods. For example, processing of multiplying at least one of the gradation value indicated by the first amount-of-color-material data and the gradation value indicated by the second amount-of-color-material data by a weighting factor and thus acquiring the sum of these gradation values, or the like, may be employed.

When the image data includes only one of the first image data and the second image data, it is not necessary to combine the image data. Therefore, for example, when the image data includes the first image data and does not include the second image data, the first amount-of-color-material data generated from the first image data and the third amount-of-color-material data are the same data. When the image data includes the second image data and does not include the first image data, the second amount-of-color-material data generated from the second image data and the third amount-of-color-material data are the same data.

The transmission unit 120*f* is a part of the processor 120 that has a function of transmitting print data based on the third amount-of-color-material data to the printing device. The print data is data that can be printed by the printing device 200. In this embodiment, printing is executed, based on halftone data indicating that a color material is recorded or not recorded for each pixel and also indicating the size of the color material (the size of the ink droplet) in any one of three stages in the case of recording. Therefore, the transmission unit 120*f* executes halftone processing for converting the third amount-of-color-material data into halftone data, and transmits the resulting halftone data to the printing device 200. The halftone processing may be performed by a known method. When the print data including the halftone data is transmitted to the printing device 200, the printing device 200 prints the image represented by the halftone data. The processor 120 may have a halftone processing unit that converts the third amount-of-color-material data into the halftone data, separately from the transmission unit 120*f*.

With the above configuration, color conversion can be performed in a mode corresponding to the color expression method in each of the first image data and the second image data, and the amount-of-color-material data can be specified. Therefore, image processing corresponding to each of an image including colors other than the special color and an image expressed with the special color can be executed to perform printing.

(1-2) Configuration of Printing Device

The printing device 200 includes a processor 220, a nonvolatile memory 230, a UI unit 240, a communication unit 250, and a printing unit 260. The processor 220 includes a CPU, a ROM, a RAM, and the like, not illustrated, and can execute various programs recorded in the nonvolatile memory 230 and thus control each part of the printing device 200. The processor 220 may be configured with a single chip or may be configured with a plurality of chips. For example, an ASIC may be employed instead of the CPU, or the CPU and the ASIC may cooperate with each other.

The communication unit 250 includes a communication interface for communicating with an external device according to various wired or wireless communication protocols. The communication unit 250 also includes an interface for communicating with various removable memories attached to the printing device 200. The printing device 200 can communicate with the image processing device 100 via the communication unit 250.

In this embodiment, the printing unit 260 can execute printing on various types of print media by an inkjet method in accordance with an instruction from the processor 220. The printing unit 260 includes a conveyance mechanism that conveys a print medium, and a print head that ejects ink droplets onto the print medium. The print head in this embodiment can eject the color materials of the eight colors of C, M, Y, K, G, Gy, R, and Or, as described above. Also, in this embodiment, ink droplets in three sizes of large, medium, and small can be ejected from a nozzle in the print head.

The UI unit 240 includes a touch panel display, various keys and switches, and the like. The touch panel display includes a display panel that displays various kinds of information under the control of the processor 220, and a touch detection panel superimposed on the display panel, and detects a touch operation by a human finger or the like. The processor 220 can acquire the content of a user's operation via the UI unit 240. The processor 220 can also display various information on the display of the UI unit 240 and thus notify the user of the information.

The processor 220 can execute a print program, not illustrated, that is recorded in the nonvolatile memory 230. The print program causes the processor 220 to implement a function for printing print data. When a preview image display program is executed, the processor 220 functions as a receiving unit 220*a* and a processing unit 220*b*.

The receiving unit 220*a* is a part of the processor 220 that has a function of receiving the print data transmitted from the image processing device 100. The receiving unit 220*a* acquires the print data from the image processing device 100 via the communication unit 250 and records the print data in the nonvolatile memory 230. The processing unit 220*b* is a part of the processor 220 that has a function of controlling the printing unit 260 to execute printing. That is, the processing unit 220*b* drives the printing unit 260, based on the print data acquired from the image processing device 100, and thus executes printing.

(2) Image Processing

Figure 4:
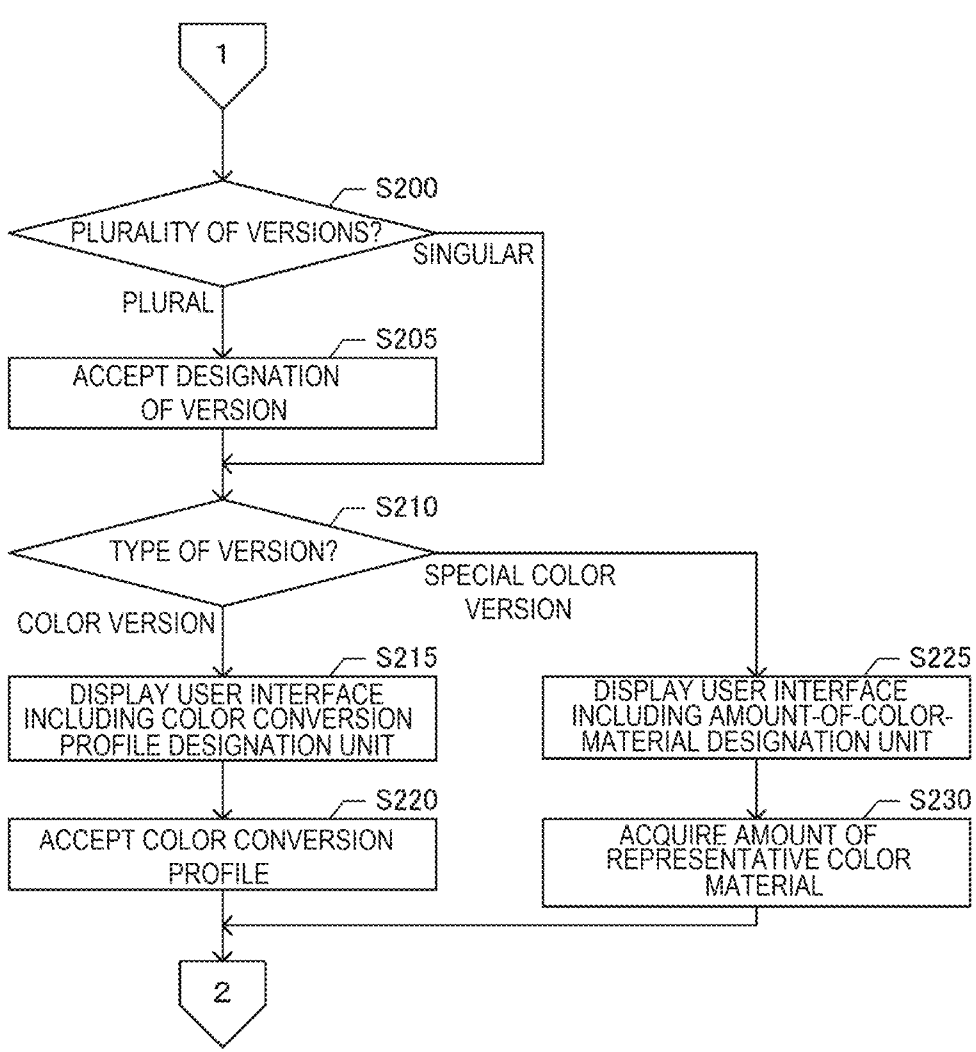
FIG. 4 is a flowchart showing image processing.

FIGS. 3 and 4 are flowcharts showing image processing executed by the processor 120. The image processing is started in response to an operation of the UI unit 140 by the user to input a start instruction, or the like. When the image processing is started, the processor 120 displays the user interface by the function of the display control unit 120*b* (step S100).

Figure 5:
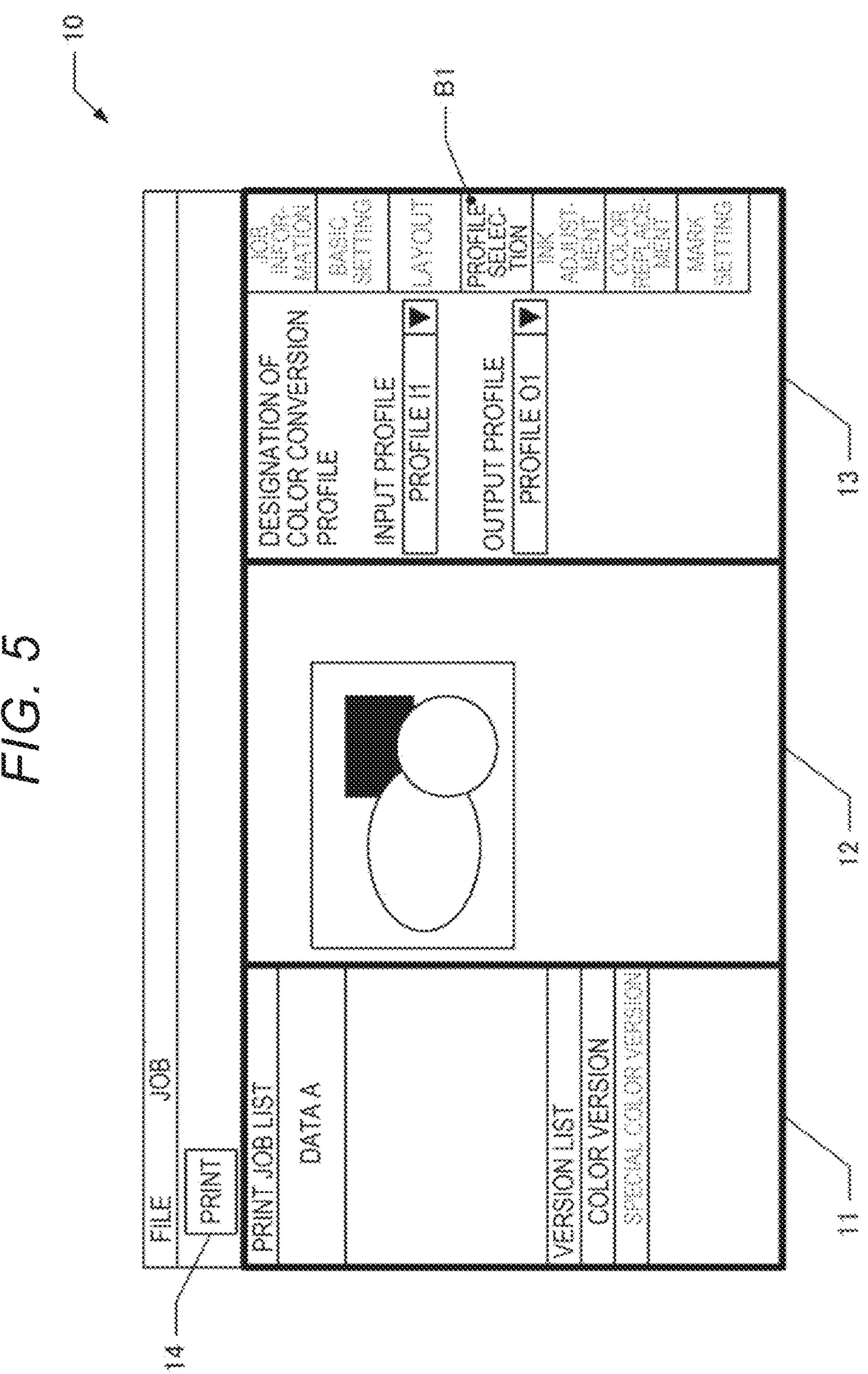
FIG. 5 shows an example of a user interface.

FIG. 5 is a diagram illustrating an example of a user interface 10. The user interface 10 according to this embodiment includes an image instruction unit 11, a preview image display unit 12, and a color setting unit 13. In FIG. 5, the image instruction unit 11, the preview image display unit 12, and the color setting unit 13 are surrounded by a thick frame for the sake of explanation, but in practice, the frame may have a thickness similar to that of the other lines instead of the thick line. A print instruction button is 14 provided above the image instruction unit 11.

The image instruction unit 11 is a user interface on which image data selected as a print target is displayed, and which is used to designate one of the versions (one of the first image data and the second image data) included in the selected image data as a processing target. The preview image display unit 12 is a user interface for displaying a preview image of an image to be printed. The color setting unit 13 is a user interface for configuring a setting related to the color of the image data. The example of the user interface 10 shown in FIG. 5 is not the initial screen of the user interface 10. In the initial screen, no image data is displayed in a print job list in the image instruction unit 11, and no version is displayed in a version list. In the initial screen, no preview image is displayed in the preview image display unit 12. In the initial screen, default information may or may not be displayed in the color setting unit 13.

As illustrated in FIG. 3, in the state where the initial screen is displayed in step S100, the display control unit 120*b* accepts a designation of image data (step S105). That is, the user operates the UI unit 140 to designate image data to be printed from the image data stored in the nonvolatile memory 130 or the like. The display control unit 120*b* accepts this designation and displays the file name of the designated image data in an upper part of the image instruction unit 11. FIG. 5 shows an example in which image data with a file name of data A is designated.

Also, the display control unit 120*b* displays the version list (step S110). Specifically, when the first image data is included in the designated image data, the display control unit 120*b* displays a character string "color version" in the version list and thus explicitly indicates to the user that the first image data is included. When the second image data is included in the image data, the display control unit 120*b* displays a character string "special color version" in the version list and thus explicitly indicates to the user that the second image data is included. The character string displayed in the version list may be any character string that enables the user to identify the version, and is freely set in the image data.

Next, the processor 120 sets the type of image data included in the image data, that is, sets the value of a constant max as the number of versions and initializes a variable i to 1 (step S115). Here, the variable i is a number indicating the version included in the image data, and for example, when one piece of the first image data and one piece of the second image data are included in the image data, the first version is the first image data and the second version is the second image data, and when two or more types of special color versions are included, versions from the third version onward can be the second image data.

The processor 120 determines the type of the i-th version (step S120). When it is determined that the type of the i-th version is the color version, the conversion unit 120*d* converts the color of each pixel, based on the color conversion profile, and acquires the amount of color material (step S125). Specifically, the conversion unit 120*d* refers to the nonvolatile memory 130 and acquires a color conversion profile used for the conversion. Then, the RGB gradation values of each pixel of the first image data included in the image data are converted into CMYKGGyROr gradation values. That is, the conversion unit 120*d* acquires the first amount-of-color-material data. The acquired first amount-of-color-material data is stored in the nonvolatile memory 130 or the like. When step S125 is executed for the first time, the conversion unit 120*d* performs conversion using a default color conversion profile, but after the user designates a color conversion profile via a color conversion profile designation unit, described later, the designated color conversion profile is used.

Meanwhile, when it is determined in step S120 that the type of the i-th version is the special color version, the processor 120 determines whether the amount of representative color material is already designated (step S130). That is, the processor 120 determines whether the user has already designated the amount of representative color material through processing, described later. When it is not determined that the amount of representative color material is already designated, the conversion unit 120*d* converts the representative color, based on the color conversion profile, and the amount-of-representative-color-material acquisition unit 120*c* acquires the converted value as the amount of representative color material (step S135). That is, the conversion unit 120*d* acquires the color conversion profile with reference to the nonvolatile memory 130, and converts the representative gradation value, which is the RGB gradation values of the representative color included in the header of the image data, into the CMYKGGyROr gradation values. The converted gradation value is acquired as the amount of representative color material by the amount-of-representative-color-material acquisition unit 120*c*. The acquired amount of representative color material is stored in the nonvolatile memory 130 or the like. When the color conversion profile is already designated by the user through the processing, described later, the conversion unit 120*d* performs color conversion with reference to the designated color conversion profile. However, when the color conversion profile is not designated yet by the user, the conversion unit 120*d* performs color conversion with reference to the default color conversion profile.

When it is determined in step S130 that the amount of representative color material is already designated, step S135 is skipped. When step S135 is executed, or when it is determined in step S130 that the amount of representative color material is already designated, the conversion unit 120*d* converts the colors other than the representative color, based on the amount of representative color material, and acquires the amount of color material (step S140). That is, the conversion unit 120*d* multiplies the amount of representative color material of each color by the gradation value of each pixel/128, and thus acquires the amount of color material of the colors other than the representative color. The amount of representative color material in the case where step S135 is skipped is a value directly designated by the user through the processing, described later. The conversion unit 120*d* regards the data representing the color by the acquired amount of color material as the second amount-of-color-material data and stores the data in the nonvolatile memory 130 or the like.

When step S125 or step S140 is executed, the processor 120 determines whether the variable i coincides with max (step S145). When it is not determined in step S145 that the variable i coincides with max, the processor 120 increments the variable i, and repeats the processing from step S120 onward.

When it is determined in step S145 that the variable i coincides with max, the combining unit 120*e* combines the first amount-of-color-material data and the second amount-of-color-material data (step S150), and thus acquires the third amount-of-color-material data. The combining is implemented by the sum of the gradation values indicating the amount of the color material, but in this embodiment, the combining is performed in such a way that the amount of color material does not exceed an upper limit amount of color material. Specifically, the combining unit 120*e* acquires the sum of the gradation value indicated by the first amount-of-color-material data and the gradation value indicated by the second amount-of-color-material data for each pixel and each color. As a result, a gradation value indicating the amount of the color material for printing the image data for each color of the color material is acquired.

As for the amount of color material that can be printed on the print medium, an upper limit amount of color material is provided for each color, and an upper limit amount of color material for the total of all the colors is provided. The upper limit amount of color material is provided for the purpose of suppressing ink bleeding on the print medium due to an upper limit in the amount of ink droplets ejected by the print head or when the color material is excessive. Then, the combining unit 120*e* executes processing of comparing the sum of the gradation values for each color with the upper limit amount of color material for each color, with respect to all the pixels. For a pixel for which the sum of the gradation values for each color exceeds the upper limit amount of color material for each color as the result of the comparison, the amount of color material is converted to the upper limit amount of color material or less. This conversion may be performed by various methods, and the amount of color material may be changed to the upper limit amount of color material only for a color exceeding the upper limit amount of color material or may be changed to the upper limit amount of color material for a color exceeding the upper limit amount of color material while the ratio of each color is maintained.

After performing the above processing for each color, the conversion unit 120*d* further totals the gradation values of all the colors for each pixel. The conversion unit 120*d* then performs processing of comparing the total gradation value with the upper limit amount of color material for the total of all the colors, with respect to all the pixels. For a pixel for which the total gradation value exceeds the upper limit amount of color material as the result of the comparison, the amount of color material is converted to the upper limit amount of color material or less. This conversion, too, may be performed by various methods. For example, the amount of color material may be changed in such a way that the total gradation value becomes the upper limit amount of color material while the ratio of each color is maintained. As described above, in this embodiment, the conversion is performed so as not to exceed the upper limit amount of color material, and the third amount-of-color-material data is thus generated.

When the third amount-of-color-material data is generated, the display control unit 120*b* causes the display device of the UI unit 140 to display a preview image (step S155). Specifically, the display control unit 120*b* generates a third preview image for displaying an image represented by the third amount-of-color-material data on the display device, based on the third amount-of-color-material data generated in step S150. The third preview image is defined by data for displaying the image represented by the third amount-of-color-material data on the display device.

As the method for generating the third preview image, various methods can be employed. For example, an example in which an LUT for converting gradation values of the respective colors of CMYKGGyROr constituting the third amount-of-color-material data into RGB gradation values is generated in advance, may be employed. In this case, the processor 120 can employ a configuration in which RGB gradation values are acquired from gradation values of the respective colors of CMYKGGyROr, based on the LUT, and the acquired RGB gradation values are added up or multiplied by a weighting factor and then added up, or the like. By performing the above processing for each pixel, the third preview image is acquired.

When the third preview image is acquired, the display control unit 120*b* controls the display device of the UI unit 140 to display the third preview image as a preview image. In the examples shown in FIGS. 5 and 6, the preview image is displayed in the frame of the preview image display unit 12. Of course, the display control unit 120*b* may reduce or enlarge the third preview image in order to display the preview image in the frame of the preview image display unit 12.

With the above configuration, the user can recognize the color of the image data to be printed by the printing device 200, based on the current color setting. Therefore, the user can check whether printing is performed with a color desired by the user, before the printing.

Next, as illustrated in FIG. 4, the display control unit 120*b* determines whether a plurality of versions are included in the image data (step S200). That is, the display control unit 120*b* refers to the header of the image data designated in step S105 and specifies the type of the data included in the image data from the first image data and the second image data. When the type of the data included in the image data is both the first image data and the second image data, the display control unit 120*b* determines that the number of versions is plural. When the type of the data included in the image data is one of the first image data and the second image data, the display control unit 120*b* determines that the number of versions is singular.

When it is determined in step S200 that a plurality of versions are included in the image data, the display control unit 120*b* accepts a designation of a version (step S205). The character string displayed in the version list in step S110 is an option selected by the user. That is, the character string displayed in the version list functions as a selection unit for selecting one of the first image data and the second image data. The user can operate the UI unit 140 to select any one of the character strings displayed in the version list. When the selection is performed, the display control unit 120*b* accepts the designation of the version. In the example shown in FIG. 5, the selected version is expressed by black characters, and the unselected version is expressed by a grayed-out character string. Therefore, FIG. 5 shows a state where the color version is selected. FIG. 6 shows a state where the special color version is selected in the same user interface as in FIG. 5. Of course, only one version, which is one of the first image data and the second image data as the type of the data included in the image data, is displayed in the version list.

When it is determined in step S200 that the number of versions included in the image data is singular, or when step S205 is executed, the display control unit 120*b* determines the type of the designated version (step S210). Specifically, when a single version is included in the image data, the display control unit 120*b* determines whether the type of the version is the color version or the special color version. When a plurality of versions are included in the image data, the display control unit 120*b* determines whether the type of the version designated in step S205 is the color version or the special color version.

When it is determined in step S210 that the type of the version is the color version, the display control unit 120*b* causes a user interface including the color conversion profile designation unit to be displayed in the color setting unit 13 (step S215). That is, when the color version is selected by the user and when the image data includes only the color version (first image data), the user interface including the color conversion profile designation unit is displayed in the color setting unit 13. The state where the color version is selected is equivalent to the state where the first image data is selected in the selection unit.

The color conversion profile designation unit is a user interface for configuring the setting for the color in the first image, and in this embodiment, includes a button B1 to give an instruction to start the designation of a color conversion profile. The color setting unit 13 is provided with various buttons other than the button B1 as the color conversion profile designation unit, and the user can operate the UI unit 140 to select each button and thus cause a user interface allocated to each button to be displayed in the color setting unit 13.

When step S215 is executed and the button B1 is selected, the display control unit 120*b* controls the UI unit 140 to display a screen that enables the designation of a color conversion profile, in the color setting unit 13. In the color setting unit 13 shown in FIG. 5, the button B1 is selected and a screen that enables the designation of a color conversion profile is displayed. Specifically, character strings representing the input profile and the output profile are displayed in the color setting unit 13, and each profile can be designated by a pull-down menu. When the user operates the UI unit 140 to designate the display of the pull-down menu, the display control unit 120*b* displays the color conversion profiles stored in the nonvolatile memory 130 or the like, in a selectable manner. The user can operate the UI unit 140 to designate a color conversion profile.

When the color conversion profile is designated by the user, the display control unit 120*b* accepts the designated color conversion profile as a color conversion profile to be used (step S220). The color conversion profile to be used is stored in the nonvolatile memory 130 or the like, and is referred to at the time of color conversion. When steps S125 and S135 are executed again, the conversion is performed, based on the designated color conversion profile.

Meanwhile, when it is determined in step S210 that the type of the version is the special color version, the display control unit 120*b* causes a user interface including the amount-of-color-material designation unit to be displayed in the color setting unit 13 (step S225). That is, when the user selects the special color version and when the image data includes only the special color version (second image data), the user interface including the amount-of-color-material designation unit is displayed in the color setting unit 13. The state where the special color version is selected is equivalent to the state where the second image data is selected in the selection unit.

The amount-of-color-material designation unit is a user interface for configuring the setting for the color in the second image, and in this embodiment, includes a user interface for designating the amount of a plurality of color materials to be used in the printing device 200 when printing the special color. The user interface displayed in the color setting unit 13 in FIG. 6 is the amount-of-color-material designation unit. In this example, since only one button is displayed on the right side of the color setting unit 13, the user interface displayed in the color setting unit 13 in the state where the special color version is selected is the one type of user interface illustrated in FIG. 6.

The amount-of-color-material designation unit illustrated in FIG. 6 includes an input unit for inputting a value corresponding to the amount of color material of each of the plurality of color materials used to print the representative color. Specifically, character strings indicating the respective colors of cyan (C), magenta (M), yellow (Y), black (K), green (G), gray (Gy), red (R), and orange (Or) are displayed in the amount-of-color-material designation unit. In addition, boxes for inputting numerical values are associated with the character strings of the respective colors, and the user can operate the UI unit 140 to correct the numerical values in the boxes. In this example, the numerical value is a percentage value indicating the amount of color material, and 100% is an upper limit value of the amount of color material that can be recorded on the print medium, whereas 0% means that no color material is recorded on the print medium. Since the numbers and types of color materials to be used vary depending on the model and specifications of the printing device, the character string indicating each color in the amount-of-color-material designation unit displayed in the color setting unit 13 varies depending on the printing device that executes the print job.

When the numerical value is input by the user, the amount-of-representative-color-material acquisition unit 120*c* acquires the amount of representative color material (step S230). That is, the amount-of-representative-color-material acquisition unit 120*c* converts the numerical value of the percentage input in step S225 into the amount of representative color material indicating the amount of the color material of each color, using the LUT, not illustrated, that is stored in the nonvolatile memory 130 or the like.

When step S220 or step S230 is executed, the processor 120 repeats the processing from step S115 onward. When the user does not make the correction in step S220 or step S230, the processor 120 may return to step S115 without accepting any correction.

When the user makes the correction in step S220 or step S230, the first amount-of-color-material data and the second amount-of-color-material data are generated, based on the color conversion profile and the amount of representative color material after the correction, in the processing from step S115 onward. Thus, when step S155 is executed again, a preview image reflecting the result of the correction made by the user is displayed on the display device of the UI unit 140.

According to the above processing, the amount-of-representative-color-material acquisition unit 120*c* can accept the correction of the amount of representative color material by the user. That is, when the color of the preview image displayed in the preview image display unit 12 is different from the user's intention, the user can correct the amount of the color material by designating the color conversion profile in step S215 or designating the amount of color material in step S225. Therefore, the user can adjust the amount of the color material so as to output a desired color.

In the above processing, when the image data includes the first image data and does not include the second image data, the color conversion profile can be designated by the color conversion profile designation unit. Therefore, the amount of the color material used when printing the first image represented by the first image data can be adjusted by designating the color conversion profile. Thus, the color of the first image generally including a plurality of colors can be easily adjusted.

Meanwhile, when the image data includes the first image data and the second image data, the color conversion profile designation unit and the amount-of-color-material designation unit can be used. More specifically, in the state where the first image data is selected, the color conversion profile can be designated by the color conversion profile designation unit. Meanwhile, in the state where the second image data is selected, the amount of the color material can be specified by the amount-of-color-material designation unit.

Therefore, the amount of the color material used when printing the first image represented by the first image data can be adjusted by designating the color conversion profile. Thus, the color of the first image generally including a plurality of colors can be easily adjusted. Also, by designating the amount of the color material used when printing the special color by the amount-of-color-material designation unit, the amount of the color material used when printing the second image expressed with the special color represented by the second image data can be adjusted. Thus, the amount of the color material for printing the special color can be adjusted by designating the amount of color material for only one color. With the above configuration, the amount of the color material used for printing an image that may include a mixture of an image including a color other than a special color and an image expressed with the special color can be adjusted in a mode corresponding to the type of each image. Thus, the color of each image can be adjusted efficiently.

(3) Print Processing

Figure 7:
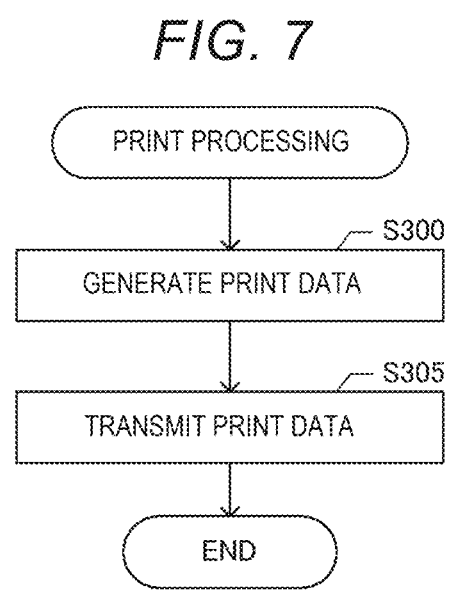

In the state where the image processing shown in FIGS. 3 and 4 is executed, the processor 120 can accept various interrupts. In this embodiment, one of the interrupts is print processing. That is, when the user operates the UI unit 140 to give an instruction using the print instruction button 14, it is determined that a print instruction is given, and the print processing shown in FIG. 7 is started.

When the print processing is started, the transmission unit **120*f* generates print data, based on the third amount-of-color-material data acquired in step S150 (step S300). That is, the transmission unit 120*f* executes halftone processing, based on a known method, and converts the third amount-of-color-material data into halftone data and thus generates the print data. When the print data is generated, the transmission unit 120*f* transmits the print data to the printing device 200 (step S305). With the above configuration, the image represented by the image data can be printed by the printing device 200**.

(4) Other Embodiments

The above-described embodiment is an example for implementing the present disclosure, and various other embodiments may be employed. For example, the image processing device may be a printing device or a multifunction peripheral having a printing function. The image processing device may also be a personal computer, a tablet terminal, a smartphone, or the like that functions as an image processing device that generates a print job. Moreover, an alternative measure may be employed in the various kinds of image processing described above. For example, while the preview image is generated, based on the amount-of-color-material data in the above-described embodiment, the preview image may be generated, based on the halftone data.

Also, the mode for acquiring the amount of representative color material is not limited to the mode in which the representative gradation value is converted, based on the color conversion profile, as in the above-described embodiment, or the mode in which the amount of the color material for each color is designated by the user. For example, the amount of representative color material may be specified, based on a color patch. Such a mode can be implemented, for example, by storing the amount of the color material used for each of a plurality of color patches having different amounts of the color material, in a storage unit such as the nonvolatile memory 130 in advance.

In this configuration, the amount-of-representative-color-material acquisition unit **120*c* accepts the identification number of a color patch input to an identification number input unit by the user operating the UI unit 140. The amount-of-representative-color-material acquisition unit 120*c*** acquires the amount of the color material used to print the color patch of the accepted identification number as the amount of representative color material, based on the information stored in the storage unit. With this configuration, the user can specify the amount of representative color material while checking the actual print color via the color patch.

The storage unit may store the amount of the color material used for each of the plurality of color patches having different amounts of the color material. That is, by referring to the information stored in the storage unit based on the selected color patch, the amount of the color material used for the color patch may be specified. The color patch may be a color sample prepared in advance or may be printed by a printing device. In the latter case, preferably, a color patch including a plurality of special colors may be printed. With this configuration, the user can set a desired special color as the representative color, from among the plurality of color patches.

Also, the preview image displayed in step S155 is not limited to the third preview image. For example, the processor 120 may be configured to generate the second preview image for displaying the second image represented by the second amount-of-color-material data on the display device and thus display the second preview image on the display device. In this case, the second preview image can be displayed within the frame of the preview image display unit 12. The second preview image can be generated from the second amount-of-color-material data by processing similar to the processing for generating the third preview image from the third amount-of-color-material data. With this configuration, the user can adjust the color, based on the preview image, with respect to the special color, which is more likely to require the accuracy of the color to be printed than general colors.

Of course, the first preview image for displaying the first image represented by the first amount-of-color-material data on the display device may be previewable, or a desired image from among the first preview image, the second preview image, and the third preview image may be previewable, or a plurality of images may be simultaneously previewable.

Also, the user may be notified that the amount of color material exceeds the upper limit amount of color material.

Such a configuration can be implemented by a configuration where the processor 120 compares the amount of color material represented by the third amount-of-color-material data with the upper limit amount of color material, and displays a warning on the display device when the amount of color material represented by the third amount-of-color-material data exceeds the upper limit amount of color material. As the mode of the warning, various modes may be employed, and a pixel at which the amount of color material exceeds the upper limit amount of color material may be explicitly indicated, or the warning may be given without explicitly indicating the pixel. Of course, the warning may be given along with the display of the preview image. With the above configuration, the user can easily recognize whether printing can be performed according to the current color setting.

The image data acquisition unit may be able to acquire image data including the first image data representing the first image with a plurality of colors including a color other than a special color and the second image data representing the second image with the special color. That is, the image data acquisition unit may be able to acquire image data representing the first image expressed with any color in the color gamut and the second image expressed by the special color, which is a specific color. The format of the image data is not limited as long as the image data can include these images. Thus, the image data is not limited to the configuration where the first image and the second image are distinguished as images of different versions. For example, data in which data of a total of four channels including first image data of three channels forming the first image and second image data of one channel forming the second image are described without being distinguished from each other may be employed as the image data.

The special color is a color specified in advance from among colors that can be expressed by the printing device, and may be one color or may be a plurality of colors. When the special color includes a plurality of colors, the special color includes a certain representative color and a color similar to the representative color, for example, a color having the same ratio as the gradation value of the representative color but different in at least one of density and brightness. Also, there may be a plurality of special colors when there are a plurality of types of representative colors. For example, when two types of specific corporate colors are used in certain printing, it can be said that there are a plurality of types of representative colors. In this case, the special color may include a plurality of colors different in at least one of density and brightness for each representative color. Also, in this case, a plurality of versions corresponding respectively to the plurality of representative colors may exist. Moreover, the format of the second image data is not limited to the configuration of the above-described embodiment, and the special color may be described in an image format such as RGB or CMYK.

Meanwhile, the colors other than the special color exist in the color gamut and are any colors different from the special color. Thus, the first image can be expressed using any color in the color gamut. The color gamut may be a color gamut for any device such as a display device or a printing device, and in any case, all the colors that can be expressed in a specific image format such as RGB or CMYK can be used in the first image. The special color is only a part of the colors included in the color gamut.

The amount-of-representative-color-material acquisition unit may be able to acquire the amount of representative color material indicating the amount of a plurality of color materials used for printing the representative color included in the special color by the printing device. That is, the amount-of-representative-color-material acquisition unit may be able to acquire the amount of representative color material serving as an indicator of the amount of the color material to be used for printing the special color. The representative color is one of the special colors and may be determined in advance. For example, a corporate color or one color in a color sample may be the representative color of the special color. The amount of representative color material is the amount of the color material to be used for printing the representative color, but since the color development in the printing device may vary from one printing device to another, the representative color cannot always be accurately printed depending on the amount of representative color material having a certain value. In this sense, the amount of representative color material can be said to be the amount of the color material for printing the representative color or a color similar to the representative color. The amount of representative color material may be correctable.

The color material may be any material for expressing a color, and various color materials may be used. For example, when the printing device is an inkjet printer, the color material is ink. When the printing device is an electrophotographic printer, the color material is toner. The amount of color material may be designated in various modes. For example, the amount of color material may be designated by a gradation value, which is a value within a predetermined range, as in the above-described embodiment, or the amount of color material may be designated by a density, where 0% indicates a state where the color material is not used and 100% indicates a state where the color material is used to the maximum.

The conversion unit may be able to convert the first image data into the first amount-of-color-material data representing the color of the first image by the amount of a plurality of color materials used in the printing device, based on the color conversion profile, and convert the second image data into the second amount-of-color-material data representing the color of the second image by the amount of a plurality of color materials used in the printing device, based on the amount of representative color material. That is, the conversion unit may be able to perform color conversion for acquiring the amount of the color material, based on information corresponding to each of the first image data and the second image data.

The color conversion profile may be known information used for color conversion, and an LUT or a function may be used. Also, the color conversion may be able to convert the first image data into the first amount-of-color-material data, and the mode of the color conversion may be different when the format of the first image data is different. For example, the color conversion profile referred to in the color conversion may be different between the case where the first image data is expressed in RGB and the case where the first image data is expressed in CMYK. Of course, the color conversion profile may differ according to print conditions such as the input device, the printing device, and the print medium.

The combining unit may be able to generate the third amount-of-color-material data by combining the first amount-of-color-material data and the second amount-of-color-material data. That is, the image data is data representing an image formed by combining the first image and the second image, and the image to be printed when performing printing based on the image data is the combined image. Thus, the combining unit may be able to combine the first amount-of-color-material data and the second amountof-color-material data and thus generate the third amount-of-color-material data for printing the result of combining the first image and the second image. The combining may be performed by various methods, and the first amount-of-color-material data and the second amount-of-color-material data may be simply added up, or may be multiplied by a weighting factor and then added. Also, various corrections, for example, a correction so as not to exceed the upper limit amount of the color material, or the like, may be performed.

The transmission unit may be able to transmit print data based on the third amount-of-color-material data to the printing device. That is, the transmission unit may be able to cause the printing device to print the image represented by the third amount-of-color-material data. When further processing is necessary to perform printing, the transmission unit may perform further processing on the third amount-of-color-material data. For example, when printing is performed using data formed by performing halftone processing on the third amount-of-color-material data, the transmission unit may perform halftone processing. Meanwhile, when halftone processing can be executed in the printing device, the transmission unit may transmit the third amount-of-color-material data to the printing device.

Moreover, as in the present disclosure, the above-described technique can also be implemented as a program executed by a computer or as a method. The system, the program, and the method as described above may be implemented as a single device or may be implemented by using components provided in a plurality of devices, and include various forms. Also, the present disclosure may be modified appropriately, for example, a part being software and a part being hardware. Moreover, the present disclosure is also implemented as a recording medium of a program that controls the system. Of course, the recording medium of the program may be a magnetic recording medium or a semiconductor memory, and any recording medium to be developed in the future can be considered in exactly the same way.

What is claimed is:

1. An image processing device comprising:

an image data acquisition unit configured to acquire image data including first image data representing a first image with a plurality of colors including a color other than a special color and second image data representing a second image with the special color;

an amount-of-representative-color-material acquisition unit configured to acquire an amount of representative color material indicating an amount of a plurality of color materials used for printing a representative color included in the special color by a printing device;

a conversion unit configured to convert the first image data into first amount-of-color-material data representing a color of the first image by an amount of a plurality of color materials used in the printing device, based on a color conversion profile, and convert the second image data into second amount-of-color-material data representing a color of the second image by an amount of a plurality of color materials used in the printing device, based on the amount of representative color material;

a combining unit configured to combine the first amount-of-color-material data and the second amount-of-color-material data and thus generate third amount-of-color-material data; and a transmission unit configured to transmit print data based on the third amount-of-color-material data to the printing device.

2. The image processing device according to claim 1, wherein the image data includes a representative gradation value corresponding to the representative color, the conversion unit converts the representative gradation value into an amount of a plurality of color materials used in the printing device, based on the color conversion profile, and the amount-of-representative-color-material acquisition unit acquires the amount of color materials resulting from the conversion as the amount of representative color material.

3. The image processing device according to claim 1, wherein the amount-of-representative-color-material acquisition unit is able to accept a correction of the amount of representative color material by a user, and the conversion unit converts the second image data into the second amount-of-color-material data, based on the corrected amount of representative color material.

4. The image processing device according to claim 1, further comprising:

a storage unit configured to store an amount of color material used for each of a plurality of color patches having different amounts of color material, wherein the amount-of-representative-color-material acquisition unit acquires the amount of color material used for the color patch selected from the plurality of color patches, as the amount of representative color material.

5. The image processing device according to claim 1, wherein the first t image data is data representing the plurality of colors with gradation values of a plurality of channels, and the second image data is data representing the special color with a gradation values of one channel.

6. The image processing device according to claim 1, further comprising:

a display control unit configured to generate a second preview image for causing a display device to display the second image represented by the second amount-of-color-material data on a display device, and cause the display device to display the second preview image.

7. The image processing device according to claim 1, further comprising:

a display control unit configured to compare an amount of color material indicated by the third amount-of-color-material data with an upper limit amount of color material, generate the third amount-of-color-material data in which the amount of color material is converted to the upper limit amount of color material or less when the amount of color material 1 indicated by the third amount-of-color-material data exceeds the upper limit amount of color material, and generate a third preview image for causing a display device to display an image represented by the converted third amount-of-color-material data, and cause the display device to display the third preview image.

8. The image processing device according to claim 1, further comprising:

a display control unit configured to compare the amount of color material indicated by the third amount-of-color-material data with an upper limit amount of color material, and cause a display device to display a warning when the amount of color material indicated by the third amount-of-color-material data exceeds the upper limit amount of color material.

9. An image processing method comprising:

acquiring image data including first image data representing a first image with a plurality of colors including a color other than a special color and second image data representing a second image with the special color;

acquiring an amount of representative color material indicating an amount of a plurality of color materials used for printing a representative color included in the special color by a printing device;

converting the first image data into first amount-of-color-material data representing a color of the first image by an amount of a plurality of color materials used in the printing device, based on a color conversion profile, and converting the second image data into second amount-of-color-material data representing a color of the second image by an amount of a plurality of color materials used in the printing device, based on the amount of representative color material;

combining the first amount-of-color-material data and the second amount-of-color-material data and thus generating third amount-of-color-material data; and transmitting print data based on the third amount-of-color-material data to the printing device.

10. A non-transitory computer-readable storage medium storing an image processing program, the image processing program causing a computer to function as:

an image data acquisition unit configured to acquire image data including first image data representing a first image with a plurality of colors including a color other than a special color and second image data representing a second image with the special color;

an amount-of-representative-color-material acquisition unit configured to acquire an amount of representative color material indicating an amount of a plurality of color materials used for printing a representative color included in the special color by a printing device;

a conversion unit configured to convert the first image data into first amount-of-color-material data representing a color of the first image by an amount of a plurality of color materials used in the printing device, based on a color conversion profile, and convert the second image data into second amount-of-color-material data representing a color of the second image by an amount of a plurality of color materials used in the printing device, based on the amount of representative color material;

a combining unit configured to combine the first amount-of-color-material data and the second amount-of-color-material data and thus generate third amount-of-color-material data; and a transmission unit configured to transmit print data based on the third amount-of-color-material data to the printing device.

* * * * *